Oct. 29, 1968

K. HILLMAN 3,408,595

PULSE CODE MODULATION SYSTEM

Filed May 3, 1965

4 Sheets-Sheet 1

INVENTOR
KURT HILLMAN

BY R. J. Frank
ATTORNEY

Oct. 29, 1968 K. HILLMAN 3,408,595

PULSE CODE MODULATION SYSTEM

Filed May 3, 1965

4 Sheets-Sheet 2

INVENTOR.
KURT HILLMAN
BY R. J. Frank
ATTORNEY.

INVENTOR.
KURT HILLMAN
BY R. J. Frank
ATTORNEY

Oct. 29, 1968 K. HILLMAN 3,408,595

PULSE CODE MODULATION SYSTEM

Filed May 3, 1965

4 Sheets-Sheet 4

INVENTOR.
KURT HILLMAN

BY R. J. Frank
ATTORNEY.

United States Patent Office 3,408,595
Patented Oct. 29, 1968

3,408,595
PULSE CODE MODULATION SYSTEM
Kurt Hillman, Flushing, N.Y., assignor to General Telephone and Electronics Laboratories, Inc., a corporation of Delaware
Filed May 3, 1965, Ser. No. 452,776
10 Claims. (Cl. 332—11)

ABSTRACT OF THE DISCLOSURE

A staircase waveform generator for PCM systems is described wherein all or part of an arbitrary quantizing characteristic can be generated by the control of band and level switches. The generator comprises a resistive network to which a reference voltage can be applied at many points with the effective resistance between the reference and ground being varied by switches. The network is divided into bands which permit simultaneous generation of portions of the waveform.

This invention relates to a pulse code modulation system and more particularly to a staircase waveform generator for use therein in which the size of each step is essentially independently fixed.

In pulse code modulation (PCM) systems wherein analog signal samples are converted into binary signals prior to transmission, the limitation on the number of digits in each binary word requires that the analog samples be quantized in accordance with a particular quantizing characteristic. In the art, the term quantizing is used to denote the approximation of signal amplitudes by the nearest one of a preassigned sequence of spaced discrete amplitude levels or steps.

The sequence of spaced amplitude steps, referred to as the quantizing characteristic, comprises a staircase waveform and is applied to an amplitude discriminator concurrently with the analog signal amplitude so that a comparison can be made therebetween. The number of permissible amplitude levels is determined by the number of digits in the binary code. Thus, a code of seven digits, wherein one digit represents signal polarity, permits 64 levels including zero to be used.

The quantizing characteristic may consist of a preassigned sequence of uniformly spaced discrete amplitude steps in which case uniform quantization can be attained by direct linear network encoding as described by B. D. Smith in an article entitled "Coding by Feedback Methods" found in Proceedings of the IRE, vol. 41, page 1053. Since quantization is a method of approximation, a deliberate error is introduced that remains when the signal is ultimately reconstructed by a matching linear decoding network at the receiver. In uniform quantization wherein each step of the characteristic is given equal weight, the quantizing error is most serious for the weakest signals. This becomes apparent from consideration of the fact that when a particular voltage, for example the step voltage, is assigned to all amplitudes falling in a particular quantizing interval, the absolute value of the error in any pulse sample will be limited to values between zero and the size of the step in question.

The ratio of the error signal to the signal sample is found to be highest for signals of low amplitude. This error can be quite severe when the PCM system is employed in commercial telephony, wherein the occurrence of the smaller signal is more probable than that of the greater signal. One approach to minimizing the error ratio is to increase the number of uniform quantizing levels and therefore the number of digits in the binary code. However increasing the number of binary digits increases the transmission time per signal and therefore decreases the system capacity.

Accordingly, PCM systems using nonuniform quantization, wherein the quantizing steps are given unequal weights are found particularly advantageous. These systems redistribute the quantizing steps such that the spacing therebetween is closer at lower signal amplitudes. The proper choice of the nonlinear parameter controlling incremental step size enables the error to signal amplitude ratio to be substantially improved throughout the small signal range without necessitating a change in the total number of quantizing steps employed.

In practice, two general methods of providing nonuniform quantization have been employed. One method nonlinearly preamplifies the signal samples, with what is referred to in the art as a compressor, prior to using a linear encoding network of the type described in the aforecited reference. The compressor is typically a semiconductor diode having an inherent nonlinear characteristic. In addition, a complementary expandor having an inherent characteristic matched to that of the compressor is necessary at the receiver to restore the proper amplitude distribution after linear decoding. This type of PCM system is heavily dependent on the particular properties of the nonlinear elements. And, due to the lack of stability of these nonlinear properties with temperature variation, the difficulty in attaining a particular nonlinear parameter and the problem of maintaining a tracking relation between the compressor and expandor, this type of PCM system has resulted in a generally unpredictable error being introduced.

Alternatively, certain classes of nonuniform quantizing characteristics, for example hyperbolic and logarithmic, may be generated by direct nonlinear network encoding without an instantaneous compression and expansion. Whether linear or nonlinear, network encoders and decoders employ essentially only electronic switches and resistors to accomplish quantization. These networks exhibit relative stability and are therefore preferable to nonlinear preamplifiers.

However direct nonlinear network encoding is currently restricted to a small number of classes of quantizing characteristics. The network encoders generally utilize a plurality of attenuators, connected in tandem each of which provides an attenuation which is a fixed fraction of that provided by a preceding attenuator. The different combinations of attenuators establish the amplitude steps of the quantizing characteristic with each step having a definite fixed relation with the other steps. The PCM systems using direct nonlinear network encoding may either attenuate a reference signal in accordance with the quantizing characteristic and compare it to the signal sample or attenuate the signal sample itself and compare it with a reference signal equal to the smallest amplitude level to be transmitted.

In both of the above modes of operation, the quantizing characteristic is restricted to those classes wherein the relation between steps is governed by certain mathematical expressions. This limitation has generally prevented a nonlinear network system from duplicating the quantizing characteristic of PCM systems relying on nonlinear preamplification of the signal sample. As a result, it has been found difficult to provide compatible inconnections between different PCM systems. Furthermore, the inability to generate arbitrary quantizing characteristics that can not be expressed by mathematical relations has made certain types of quantization unattainable.

The signal amplitude to be quantized by the nonlinear network is stored on a sampling capacitor for the period necessary to effect the required comparison. A high input impedance amplifier is generally connected between the sampling capacitor and the amplitude discriminator to minimize the loading of the capacitor and to provide a time constant relatively large compared to the duration of the quantizing waveform.

In practice, the duration of the characteristic or the time required for amplitude discrimination should be minimized to both reduce the effect of the sampling capacitor discharge and to increase the capacity of the time-division PCM system. However, the use of a high input impedance amplifier is generally not desirable in PCM systems wherein small signal levels are to be compared due to the problems attendant in the normal use of amplifiers, such as drift and temperature variation. In addition, the high input impedance amplifier inhibits the ability of the sampling capacitor to be discharged readily at the end of the quantizing period. Further, the use of an input amplifier in applications such as telemetering wherein a particular D.C. level must be maintained has been found to result in baseline drift during encoding.

Accordingly, an object of the present invention is the provision of a pulse code modulation system wherein the signal amplitude may be quantized in accordance with an arbitrary quantizing characteristic.

A further object is to provide a pulse code modulation system wherein the time required for amplitude discrimination is substantially reduced and the system capacity is correspondingly increased.

Another object is the provision of a waveform generator having a staircase waveform output in which the size of each step is determined essentially independently of all others.

Another object is to provide a waveform generator that exhibits a high degree of temperature stability.

Still another object is to provide a waveform generator which generates a quantizing characteristic that compensates for the discharge of the sampling capacitor.

A further object is the provision of a pulse code modulation system wherein the need for a high input impedance amplifier in the signal path is eliminated.

In accordance with the present invention, a pulse code modulation system is provided comprising a sampling capacitor which stores the signal amplitude; an amplitude discriminator connected to the sampling capacitor; a staircase waveform generator for generating an arbitrary quantizing characteristic and applying it to the discriminator; and a converting circuit for translating the discriminator output into binary code for transmission. The staircase waveform generator is formed of a plurality of orthogonal conducting paths, herein referred to as horizontal and vertical conducting paths, having a number of cross-overs therebetween. At the cross-overs, a resistor is connected between the horizontal and vertical conducting paths with the number of connected cross-overs being at least as large as the number of steps other than zero in the desired staircase waveform. In addition, each vertical conducting path is connected to a reference potential, i.e. ground, through a corresponding load resistor.

A level switch is connected to each of the horizontal conducting paths and to a reference voltage source having a magnitude at least as large as the maximum signal sample to be quantized. The actuation of a single level switch results in the corresponding vertical conducting path being connected to the reference voltage source with the portion of the reference voltage appearing across each load resistor being determined by the magnitude of the resistor connected at the corresponding cross-over. Thus, actuating one level switch procedures an output voltage across each load resistor. When more than one level switch is actuated, the voltage appearing across each load resistor increases due to the addition of parallel conducting paths and the accompanying decrease in effective resistance between the reference voltage source and each load resistor.

In practice, the level switches are concurrently actuated to provide the maximum voltage across each load resistor and are then sequentially deactuated to decrease this voltage in steps. The voltage across each load resistor appears as a staircase waveform with the occurrence of each step coinciding with the deactuation of one of said level switches.

The size of each step is determined by the variation in effective resistance due to the removal of the corresponding cross-over resistor. Hence by selecting the magnitude of these resistors in accordance with the particular quantizing characteristic desired, the present waveform generator permits any desired characteristic to be synthesized. To vary the size of any step, it is not necessary to vary each cross-over resistor but only those corresponding to that step and higher magnitude steps. The variation of these resistors permits each step to be determined essentially independently of other steps.

In addition, the waveform generated across each load resistor is independent of the other waveforms and therefore a portion of the quantizing characteristic simultaneously appears across each. By connecting a suitable band switch between each load resistor and a common input terminal of the amplitude discriminator, the actuation of a selected band switch results in the waveform corresponding to the portion of the quantizing characteristic appearing across that load resistor being supplied to the amplitude discriminator for the encoding operation.

Also, the signal amplitude on the sampling capacitor may be supplied directly to the amplitude discriminator without the use of a high input impedance amplifier therebetween. This result is due to the fact that the steps of the geneated waveform may be varied to compensate for the discharge of the sampling capacitor. As a result, the sampling capacitor can be returned to a state of zero charge relatively fast so that the time between the encoding of signal samples may be reduced.

Since the time required to quantize a signal amplitude is a limitation on the capacity of a PCM system, the present waveform generator can be used to substantially shorten the encoding period during which the amplitude discriminator compares the signal amplitude and the quantizing characteristtic. To this end, one level switch is actuated so that the voltage of the smallest step appears across each load resistor. The band switches are then actuated sequentially with the amplitude discriminator output determining within which band the signal amplitude resides. Thus, only this portion of the quantizing characteristic need be supplied to the discriminator.

Further features and advantages of the pesent invention will become more readily apparent from the following detailed description of a specific embodiment taken in conjunction with the accompanying drawings in which.

Figure 1:
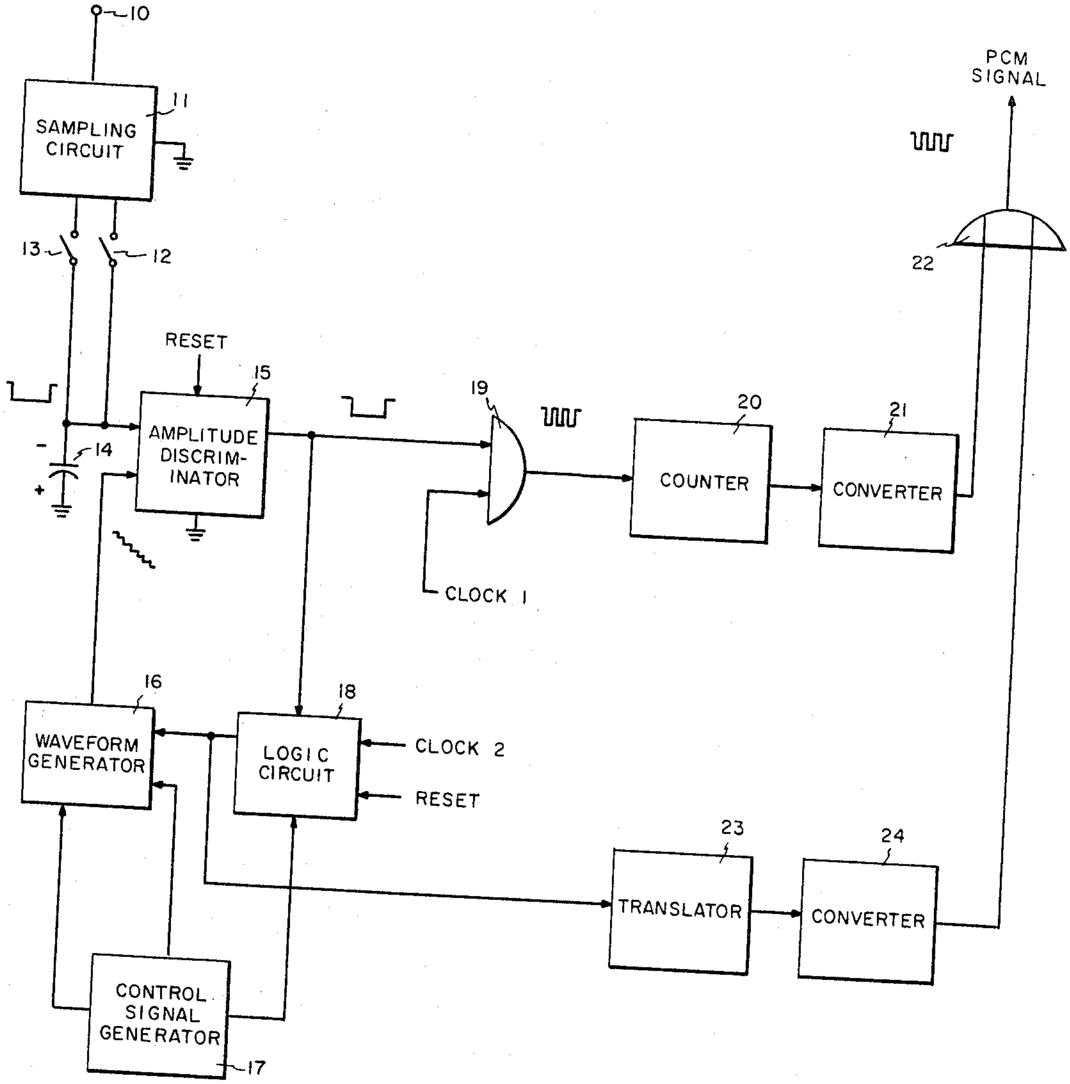
FIG. 1 is a block schematic diagram of a PCM encoder in accordance with the invention.

Referring now to FIG. 1, a single-ended PCM encoding system is shown in block form. The input signal, typically an audio signal, is applied to sampling circuit 11 at input terminal 10. The sampling circuit samples the amplitude of the input signal at particular intervals. The sampling capacitor 14 is charged to the signal amplitude through closed switch 12 and is discharged to gound after quantization and prior to the next sampling by opening switch 12 and closing switch 13. When the capacitor 14 is fully discharged, the process is repeated. One type of sampling circuit that may be used is described in an article by C. G. Davis entitled "An Experimental Pulse Code Modulation System for Short-Haul Trunks" found in The Bell System Technical Journal for January 1962 at page 5.

The voltage to which sampling capacitor 14 charges is applied directly to amplitude discriminator 15. In addition, the staircase waveform output of waveform generator 16 is applied to amplitude discriminator 15. The discriminator, which may be of the type disclosed in my copending U.S. patent application Ser. No. 400,829 filed Oct. 1, 1964, or alternatively of the type described in an article entitled "Compounded Coder System for Experimental PCM Terminal" found in The Bell System Technical Journal for January 1962 at page 202, is sensitive to a change in polarity of the net applied signal. Thus for negative signal amplitudes, the polarity of the output of the waveform generator is chosen to be a descending positive staircase and the amplitude discriminator provides an output signal when the net applied signal becomes negative.

When the magnitude of the descending positive staircase becomes less than the voltage on sampling capacitor 14, the discriminator provides an output pulse. The occurrence of the leading edge of this output pulse indicates at which step of the staircase the change in polarity takes place. The output pulse of variable duration is then "anded" with clock signal 1 at "and" gate 19 with the pulses being counted and transformed to a binary signal by a conventional pulse counter 20. The binary signal is then converted from serial to parallel form by converter 21 prior to transmission.

As shown in FIG. 1, the operation of waveform generator 16 is controlled by control signal generator 17 and logic circuit 18. In addition, the output of logic circuit 18 is supplied to a translation circuit 23 and to a serial to parallel converter 24. The outputs of converters 21 and 24 are combined at gate 22 to form the complete PCM signal for transmission. The output of logic circuit 18 when translated determines the two most significant digits of the PCM code group as will later become apparent.

Figure 2:
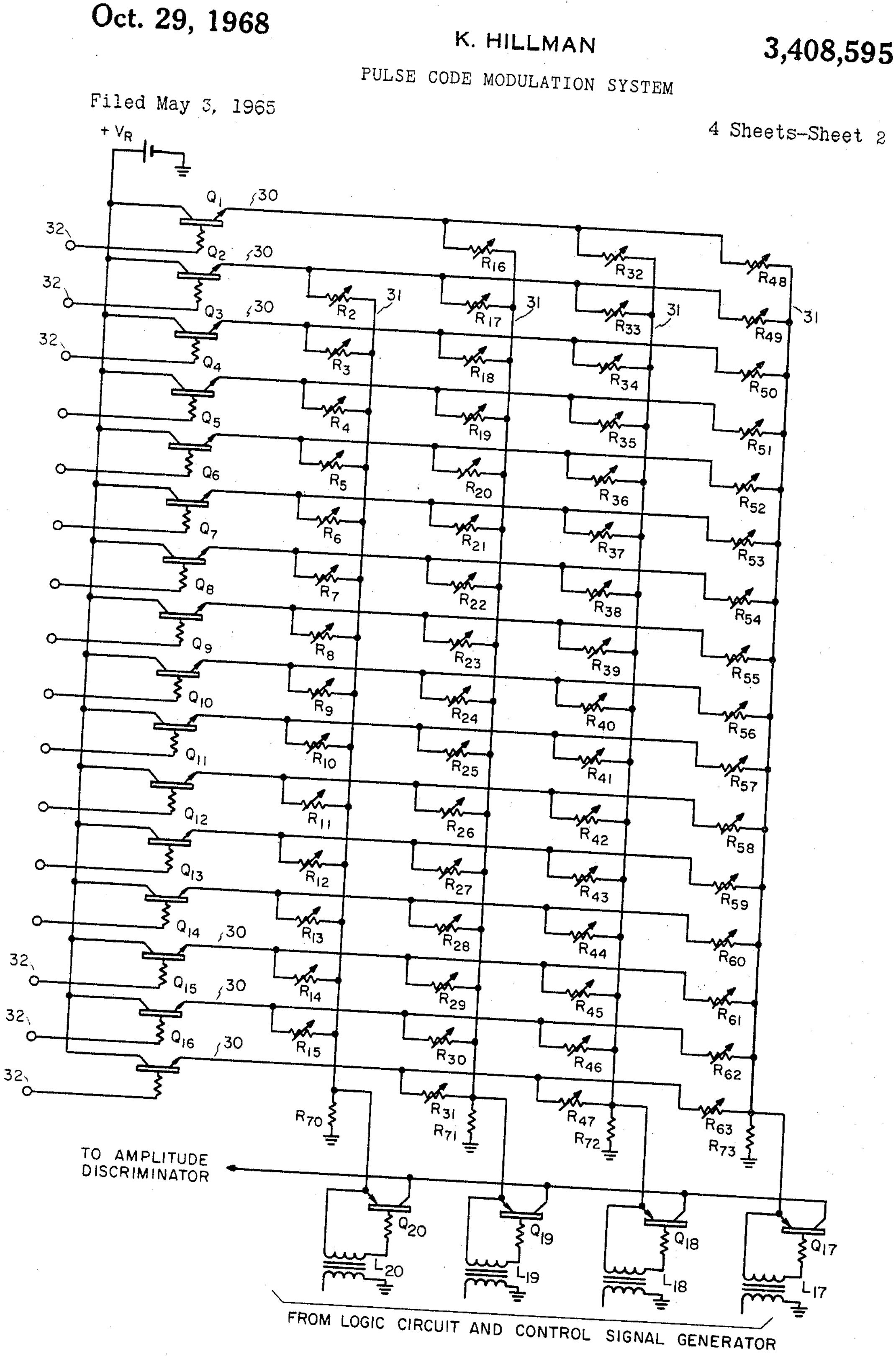
FIG. 2 is an electrical schematic diagram of the waveform generator of FIG. 1.

Waveform generator 16 is shown in FIG. 2 comprising an orthogonal matrix formed of sixteen horizontal conducting paths 30 and four vertical conducting paths 31 having 64 cross-overs therebetween. It will be noted that no cross-over resistor is provided between the first vertical and the first and last horizontal conducting paths. At the other cross-overs, resistors 2 through 63 are connected to the corresponding conducting paths. These resistors are preferably variable, although they need not be.

As shown, each horizontal conducting path is individually connected to a corresponding transistor level switch $Q_1$ through $Q_{16}$. All of these level switches are then connected to a common reference voltage source $+V_R$. The switches as shown are normally deactuated and may be actuated to connect the reference voltage source to one or more horizontal conducting paths 30 by the application of a triggering signal to selected input terminals 32. In addition, each vertical conducting path 31 is connected to a corresponding load resistor $R_{70}$, $R_{71}$, $R_{72}$, $R_{73}$ which in turn is connected to a reference potential, i.e. ground.

In the absence of a triggering signal at input terminals 32, the transistor switches are not actuated and no voltage is developed across the load resistors. When, for example, switch $Q_1$ is closed, the first horizontal conducting path is raised to a voltage of $+V_R$ and a portion of this voltage appears across load resistors $R_{71}$, $R_{72}$ and $R_{73}$. As shown, no voltage appears across load resistor $R_{70}$ since no cross-over resistor is provided between the first vertical and horizontal conducting paths.

The magnitude of the voltage appearing across each load resistor is determined by the ratio of its resistance to the sum of its resistance and the effective resistance connected between it and the positive output terminal of reference voltage source $V_R$, in this case resistors $R_{16}$, $R_{32}$ and $R_{48}$. This effective resistance can be decreased in steps producing corresponding step-like changes in the voltages appearing across each load resistor by actuating additional level switches which place additional cross-over resistors in parallel between the load resistors and the voltage $+V_R$ on the corresponding horizontal conducting paths.

The maximum voltage appearing across the load resistors occurs when all of the level switches are actuated and the aforementioned effective resistance is at a minimum. Thus, concurrently actuating the level switches and sequentially deactuating them provides a staircase voltage having descending steps across each load resistor. By varying the cross-over resistors, and the load resistors, if desired, the waveforms appearing across each load resistor may be a portion of a composite waveform in which the size of any step can be determined essentially independently of the other steps.

Although the number of steps in the composite staircase waveform can be made as large as the number of cross-over resistors, omitting the first resistor, as shown permits the lowest step to be at zero. Also, only 63 steps were desired in this embodiment so that the cross-over resistor between the first vertical and last horizontal conducting paths has been omitted.

The voltage appearing across each of the load resistors $R_{70}$, $R_{71}$, $R_{72}$ and $R_{73}$ may be supplied to amplitude discriminator 15 through transistor band switches $Q_{20}$, $Q_{19}$, $Q_{18}$ and $Q_{17}$ respectively. Although each band switch is coupled to the connection of one vertical conducting path and the corresponding load resistor, a common output is provided which is connected directly to the amplitude discriminator 15. The base of each transistor band switch is coupled through a corresponding transformer $L_{17}$, $L_{18}$, $L_{19}$ or $L_{20}$ to both control generator 17 and logic circuit 18. And, a positive pulse applied to a transformer actuates the corresponding band switch so that a desired portion of the staircase waveform is supplied to the discriminator.

The steps of the staircase waveform generated by the concurrent actuation and the sequential deactuation of the level switches are determined by the magnitude of the cross-over resistors $R_2$ through $R_{63}$. This enables an arbitrary quantizing characteristic, i.e. one which may not be capable of mathematical expression, to be produced by the waveform generator. In addition, the size of each step in the staircase waveform can be essentially independently determined and/or varied by simple techniques.

To vary for example the size of step 55, it has been found generally only necessary to vary the corresponding cross-over resistor $R_{55}$. However, for substantial changes in step size other cross-over resistors connected to level switches in this band may have to be readjusted although their step-size may be maintained. Thus to vary step 55 substantially, level switches $Q_1$ through $Q_8$ are actuated and resistor $R_{55}$ is varied. Then level switch $Q_9$ is actuated and resistor $R_{56}$ is adjusted to restore step 56 to its previous size. This procedure is followed to the highest step in the band.

The ability to vary the size of the steps is facilitated by making the cross-over resistors variable. This in turn provides an additional advantage in that the steps of the staircase waveform may be adjusted to compensate for the exponential decay of the signal amplitude stored on sampling capacitor 14. By so adjusting the waveform, the sampling capacitor can be connected directly to the amplitude discriminator without requiring a high input impedance device therebetween to minimize the capacitor discharge occurring during quantization.

While the composite staircase waveform can be generated by following the above described level switching sequence four times with a different band switch being actuated each time, this requires the amplitude discriminator to make 63 separate comparisons. It will be noted that the last step corresponds to a zero output so that the signal amplitude is compared in effect with the threshold sensitivity of the amplitude discriminator. Since this waveform generator simultaneously generates a portion of the composite staircase across each load resistor, the generator can be used to substantially decrease the time required for quantization by first determining what band the signal amplitude resides and then comparing it with only the steps in this band. Thus, only 20 comparisons are required rather than 63 and the PCM system capacity may be increased accordingly.

Figure 3:
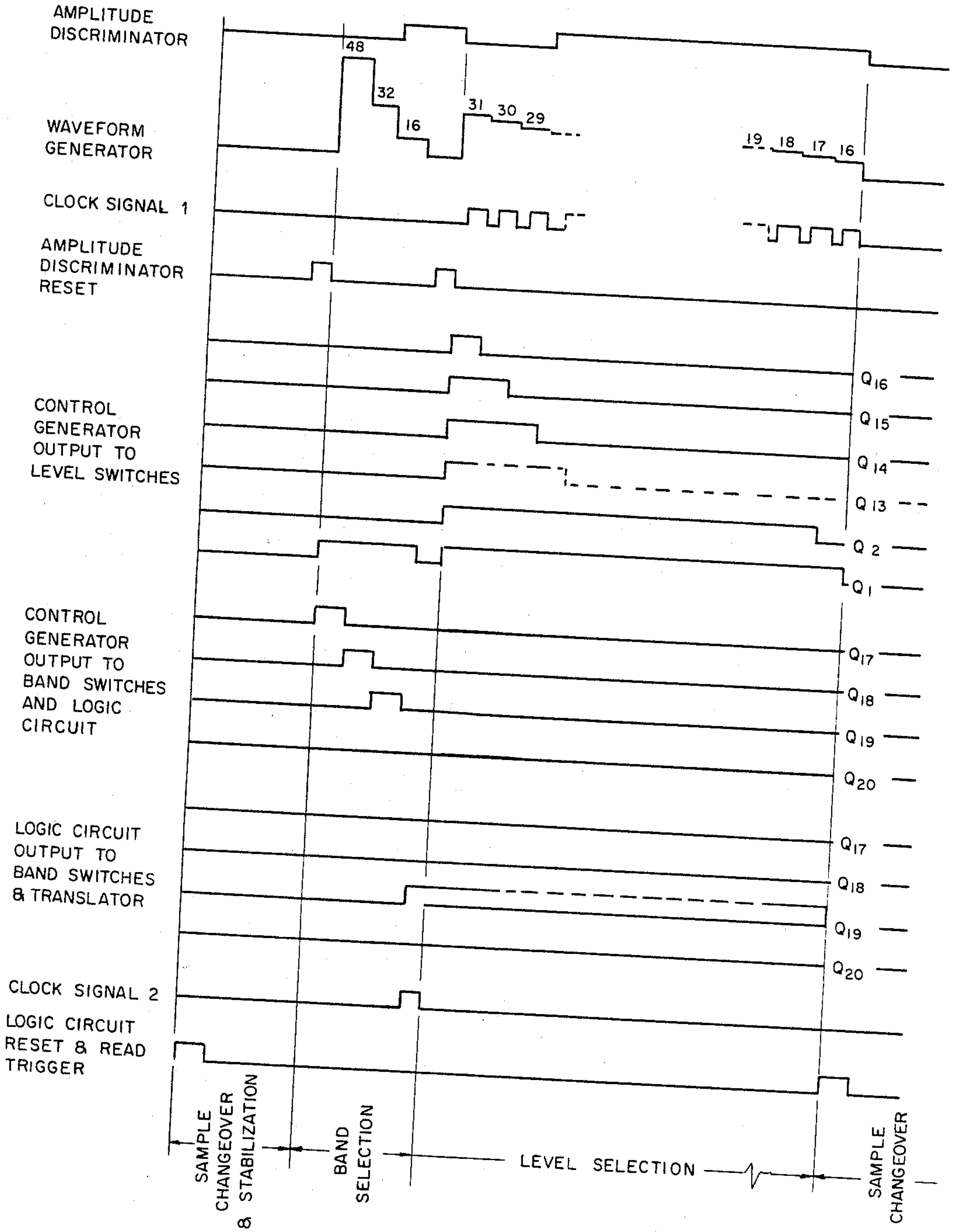
FIG. 3 is a timing diagram for the embodiment of FIG. 1.

The timing diagram of FIG. 3 taken in conjunction with the block diagram of FIG. 1 points out how this advantage may be attained. Initially, switch 13 is opened and switch 12 is closed to permit the sampling circuit to charge capacitor 14 to the signal amplitude. At this point, the amplitude discriminator is reset and the signal amplitude is compared with the smallest step in each band, in this case steps 48, 32, 16 and 0, in that order.

The band selection, as shown in FIG. 3, is provided by actuating level switch $Q_1$ from control signal generator 17 so that steps 48, 32, 16 and 0 appear across load resistors $R_{73}$, $R_{72}$, $R_{71}$ and $R_{70}$ respectively. Then the control signal generator sequentially actuates band switches $Q_{17}$, $Q_{18}$ and $Q_{19}$. Since $Q_{20}$ provides a zero output, it need not be actuated. These levels are compared with the signal amplitude and in the example shown, the discriminator provides an output at level 16. Thus it is now determined that the signal resides between steps 31 and 16.

The amplitude discriminator output is supplied to logic circuit 18 which selectively actuates band switch $Q_{19}$. At this point, the ampitude discriminator is reset, clock signal 1 is applied to "and" gate 19 and all level switches are concurrently actuated and sequentially actuated by the control signal generator.

As shown, the steps 31 to 16 are applied to the amplitude discriminator and compared with the signal amplitude. At step 28, the polarity of the net signal changes and the discriminator provides an output pulse whose duration is a function of the quantizing step 28. The output is "anded" at gate 19 with the clock pulses, then counted and transformed into binary code by counter 20. The binary signal is then converted and stored in parallel form in converter 21. The individual binary digits so stored may then be sequentially read out and supplied to combining gate 22.

At the completion of the deactuation of the level switches, the capacitor 14 is discharged and the next sample is applied thereto. Also, the logic circuit is reset. The period includes 20 comparisons rather than 63 due to the simultaneous generation of separate bands of the quantizing characteristic by the waveform generator. And as a result of this time saving, the signal handling capacity of the discriminator is significantly increased. It will be noted that the embodiment of FIG. 2 generates all 63 steps of the quantizing characteristic while employing only 20 switches. In addition, once the band selection has taken place, additional time saving may be accomplished by placing the level switches under further logical control so that the individual bands are in turn subdivided. In the example of FIG. 2, level 23 or 24 might be compared with the signal immediately after band selection and only a portion of the band need actually be generated. However, this band sub-division increases logic circuit complexity.

Figure 4:
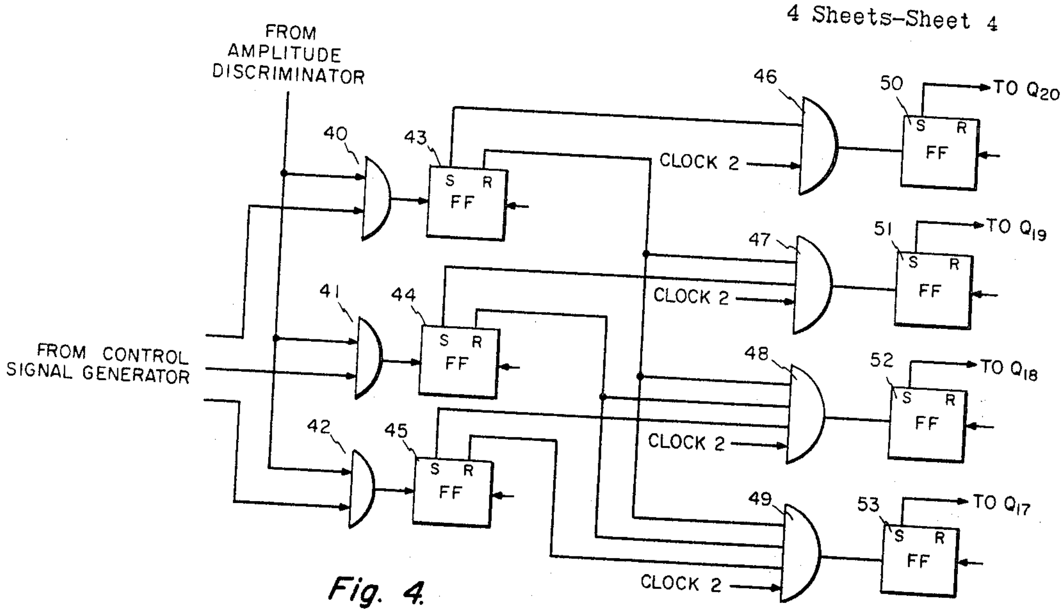
FIG. 4 is a block schematic diagram of the logic circuit shown in FIG. 1.

The logic circuit 18 is further shown in the block diagram at FIG. 4 wherein the amplitude discriminator output is supplied to "and" gates 40, 41 and 42. Also, the sequential control generator outputs to the band switches $Q_{18}$, $Q_{19}$ and $Q_{20}$ are supplied to "and" gates 42, 41 and 40 respectively. Thus, "and" gate 40 passes a signal only when the amplitude discriminator is triggered by step 48 while "and" gates 41 and 42 respond to steps 32 and 16 respectively.

The output of each "and" gate is connected to and sets a corresponding flip-flop 43, 44 and 45. The flip-flops store the results of the band selection until the completion thereof. As shown, the set output of flip-flop 43 is connected to "and" gate 46 and the reset output is connected to "and" gates 47, 48 and 49. Similarly, the set outputs of flip-flops 44 and 45 are connected to "and" gates 47 and 48 with their reset outputs coupled to gates 48, 49 and 49 respectively. To each of gates 46, 47, 48 and 49, clock signal #2 is also supplied.

When the amplitude discriminator fires during band selection, the particular flip-flop is set which in turn inhibits all succeeding "and" gates except that to which its set output is connected. The clock signal thereupon enables a signal to be passed and stored by the corresponding one of flip-flops 50, 51, 52 and 53. The set output state of this one flip-flop actuates one of the band switches $Q_{17}$ through $Q_{20}$ until the logic circuit flip-flops are reset during the sample change-over period.

In addition, the particular flip-flop that is set as a result of the band selection sequence determines the two most significant digits of the resultant code signal. By separating the quantizing characteristic into $2^N$ bands, the process of band selection determines the first N digits of the pulse code signal.

Figure 5:
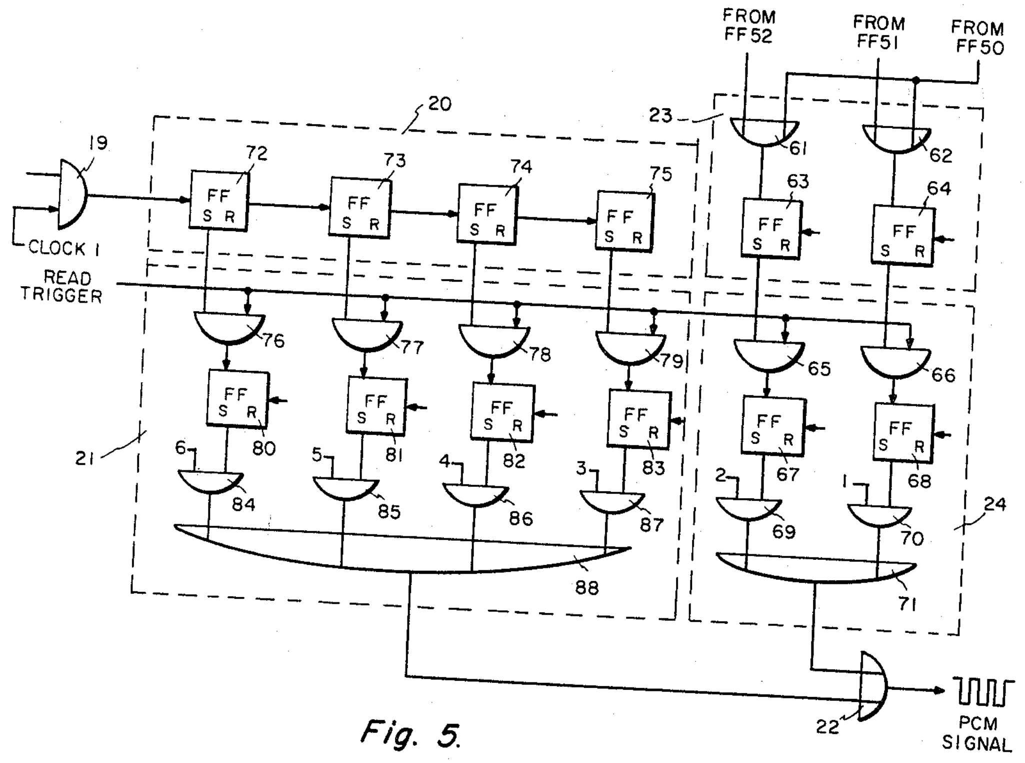
FIG. 5 is a block schematic diagram of the converter circuits shown in FIG. 1.

Accordingly, the outputs of flip-flops 50, 51 and 52 are supplied to "or" gates 61 and 62 of translator 23 as shown in FIG. 5. The outputs of the "or" gates 61, 62 are supplied to flip-flops 63, 64 respectively. As shown, a determination that the signal amplitude resides within the band bounded by steps 31 and 16 results in flip-flop 52 of logic circuit 18 being set. This in turn is passed through "or" gate 61 and sets flip-flop 63 which corresponds to the second significant digit. It will be noted that flip-flop 64, which corresponds to the first significant digit, is not set and the digit is zero. If the band selection determined that the signal amplitude resided in the band bounded by steps 47 and 32, only flip-flop 64 would be set. And if the signal amplitude was in the highest band, both flip-flops 63 and 64 would be set.

At the completion of the amplitude discrimination, the output of the translating circuit is supplied to converter 24 by the application of a read trigger to "and" gates 65, 66. The first two digits of the binary signal are stored in flip-flops 67 and 68 for sequential readout through "or" gate 71 by the application of gating signals to "and" circuits 69 and 70.

Also shown in FIG. 5 are counter 20 and converter 21 which supply the remaining binary digits for the resultant binary signal. Counter 20 is comprised of a plurality of series connected binary counting flip-flops 72, 73, 74 and 75. The pulses passed through "and" gate 19 are counted by counter 20 and supplied to storage flip-flops 80, 81, 82 and 83 by the application of a read trigger to "and" circuits 76, 77, 78 and 79 at the completion of the amplitude discrimination. The less significant digits are stored in these flip-flops for sequential readout through "or" gate 88 by the application of gating signals to "and" circuits 84, 85, 86, and 87.

The sequential readout of converters 21 and 24 is shown in FIG. 5 to begin with "and" gate 70 (indicated by the 1 at the gate terminal thereon) which provides a binary signal starting with the most significant digit. However the sequence could readily start with flip-flop 84 if desired. This readout may be conducted at any time during the next sequence since the counter 20 and translator 23 are free to receive the next signal amplitude. Since each signal amplitude requires that the amplitude comparator make only 20 comparisons, rather than 63, the time required per signal amplitude is relatively small and the capacity of the pulse code modulation system is greatly increased.

Since the above discussion has referred to a specific embodiment, it is readily apparent that many modifications may be made therein without departing from the spirit and the scope of the invention.

What is claimed is:

1. A staircase waveform generator comprising (a) A horizontal conducting paths, (b) B vertical conducting paths, said horizontal and vertical conducting paths forming AB cross-overs therebetween, (c) N cross-over resistors, each of which interconnects one of said vertical and one of said horizontal conducting paths at a cross-over, (d) A level switches, each of which is connected to one of said horizontal conducting paths and to reference voltage source, (e) means for actuating said level switches, (f) B load resistors, each of which is connected to one of said vertical conducting paths and to a reference potential, (g) B band switches, each of which is connected to the connection of one of said vertical conducting paths with its corresponding load resistor and to an output terminal, and (h) means for actuating said band switches, the actuation of at least one of said band switches and the sequential actuation of said level switches providing a staircase waveform at said output terminal.

2. A waveform generator for generating a selected portion of a non-uniform staircase waveform having (a) A horizontal conducting paths, (b) B vertical conducting paths, said horizontal and vertical conducting paths forming AB cross-overs therebetween, (c) N cross-over resistors selected in accordance with the steps of said staircase waveform, each of which interconnects one of said vertical and one of said horizontal conducting paths at a cross-over, (d) A level switches, each of which is connected to one of said horizontal conducting paths and to reference voltage source, (e) means for sequentially actuating said level switches, (f) B load resistors, each of which is connected to one of said vertical conducting paths and to a reference potential, (g) B band switches, each of which is connected to the connection of one of said vertical conducting paths with its corresponding load resistor and to an output terminal, and (h) means for actuating a selected band switch, the actuation of said selected band switch and the sequential actuation of said level switches providing a selected portion of said non-uniform staircase waveform at said output terminal.

3. A waveform generator in accordance with claim 2 in which said N cross-over resistors are variable to permit the size of particular steps to be varied essentially independently of other steps.

4. A waveform generator for generating a selected portion of a non-uniform staircase waveform having N steps of decreasing magnitude comprising (a) A horizontal conducting paths, (b) B vertical conducting paths, said horizontal and vertical conducting paths forming AB cross-overs therebetween, (c) N cross-over resistors selected in accordance with the steps of said staircase waveform, each of which interconnects one of said vertical and one of said horizontal conducting paths at a cross-over, (d) A level switches, each of which is connected to one of said horizontal conducting paths and to reference voltage source, (e) means for concurrently actuating and sequentially deactuating said level switches, (f) B load resistors, each of which is connected to one of said vertical conducting paths and to a reference potential, (g) B band switches, each of which is connected to the connection of one of said vertical conducting paths with its corresponding load resistor and to an output terminal, and (h) means for actuating a selected band switch, the actuation of said selected band switch and the concurrent actuation and sequential deactuation of said level switches providing a selected portion of said non-uniform staircase waveform at said output terminal.

5. A waveform generator in accordance with claim 4 in which said N cross-over resistors are variable to permit the size of particular steps to be varied essentially independently of other steps.

6. In a pulse code modulation system wherein a signal amplitude is stored on a sampling capacitor during quantization by an amplitude discriminator in accordance with a staircase reference waveform having N quantizing levels, a waveform generator which comprises (a) a matrix having A conducting rows and B conducting columns forming AB cross-overs therebetween, (b) A level switches each of which is connected to one of said A rows and to a reference voltage having a magnitude at least as large as the maximum signal amplitude to be quantized, (c) B load resistors each of which is connected to one of said B conducting columns and to a reference potential, (d) B band switches each of which is connected to one of said B rows and to said amplitude discriminator, the actuation of a band switch applying the voltage appearing across the corresponding load resistor to the amplitude discriminator, (e) N resistors selected in accordance with said N quantizing levels connected between said conductive rows and columns at the cross-overs therebetween, (f) means for concurrently actuating and sequentially deactuating said level switches whereby a different portion of said reference waveform appears across each of said load resistors, and (g) means for actuating a selected band switch concurrently with the actuation of said level switches.

7. Apparatus in accordance with claim 6 in which said N resistors are variable to permit the quantizing levels to be adjusted to compensate for the decay of said stored signal amplitude.

8. In a pulse code modulation system wherein a signal amplitude is stored on a sampling capacitor during quantization by an amplitude discriminator in accordance with a staircase reference waveform having N quantizing levels, a waveform generator which comprises (a) a matrix having A conducting rows and B conducting columns forming AB cross-overs therebetween, (b) A level switches each of which is connected to one of said A rows and to a reference voltage having a magnitude at least as large as the maximum signal amplitude to be quantized, (c) B load resistors each of which is connected to one of said B conducting columns and to a reference potential, (d) B band switches each of which is connected to one of said B rows and to said amplitude discriminator, the actuation of a band switch applying the voltage appearing across the corresponding load resistor to the amplitude discriminator, (e) N resistors selected in accordance with said N quantizing levels connected between said conductive rows and columns at the cross-overs therebetween, (f) means for actuating selected level switches whereby predetermined quantizing levels of said reference waveform appear across each of said load resistors, (g) means for sequentially actuating said band switches concurrently with the actuation of said selected level switches whereby the signal amplitude is compared with said predetermined quantizing levels, (h) logic means for sensing the response of said amplitude discriminator to said predetermined quantizing levels and actuating a selected band switch, and (i) means for concurrently actuating and sequentially deactuating said A level switches so that a selected portion of said reference waveform is applied to said amplitude discriminator for quantization.

9. A pulse code modulation system, wherein a signal amplitude is quantized in accordance with a staircase reference waveform having a predetermined number of amplitude levels divided into N consecutive bands and then converted to a pulse code signal, which comprises (a) an amplitude discriminator for comparing the signal amplitude with the amplitude levels of the reference waveform, said discriminator providing an output signal when said signal amplitude exceeds said reference waveform, (b) a sampling capacitor for storing said signal amplitude during the period of comparison, said sampling capacitor being connected to the input of said discriminator, (c) means for charging said sampling capacitor to said signal amplitude, (d) a reference waveform generator comprising a plurality of orthogonal conducting rows and columns forming a number of cross-overs therebetween, a number of resistors each of which is connected to a row and to a column at one of said cross-overs, a plurality of level switches each of which is connected to one of said rows and to a reference voltage source, and a plurality of load resistors each of which is connected to a conducting column and to a reference potential, the activation of selected level switches resulting in said amplitude levels being generated across said load resistors, and means for supplying the amplitude levels generated across selected load resistors to the input of said amplitude discriminator, (e) means for actuating selected level switches of said generator, when said sampling capacitor is charged to generate the smallest amplitude level in each of said N bands, (f) a first converter connected to the output of said amplitude discriminator for converting the discriminator output signal response to the smallest steps into the N most significant digits of the pulse code signal, (g) logic means connected to the output of said amplitude discriminator and to said waveform generator for receiving the discriminator output signal response to said smallest steps and actuating said generator to sequentially generate the amplitude levels in the band containing said signal amplitude, and (h) a second converter connected to the output of said discriminator for converting the output signal response thereof to said band of amplitude levels into the remaining digits of said pulse code signal, the output signals of said first and second converters comprising the resultant pulse code signal.

10. A pulse code modulation system, wherein a signal amplitude is quantized in accordance with a staircase reference waveform having a predetermined number of amplitude levels divided into N consecutive bands and then converted to a pulse code signal, which comprises (a) an amplitude discriminator for comparing the signal amplitude with the amplitude levels of the reference waveform, said discriminator providing an output signal when said signal amplitude exceeds said reference waveform, (b) a sampling capacitor for storing said signal amplitude during the period of comparison, said sampling capacitor being connected to the input of said discriminator, (c) means for charging said sampling capacitor to said signal amplitude, (d) a reference waveform generator comprising a plurality of orthogonal conducting rows and columns forming a number of cross-overs therebetween, a number of resistors equal to the number of amplitude levels to be generated each of which is connected to a row and to a column at one of said cross-overs, a plurality of level switches each of which is connected to one of said rows and to a reference voltage source, and a plurality of load resistors each of which is connected to a conducting column and to a reference potential, the actuation of selected level switches resulting in a band of said amplitude levels being generated across each of said load resistors, and means for supplying the amplitude levels generated across selected load resistors to the input of said amplitude discriminator, (e) means for actuating selected level switches of said generator, when said sampling capacitor is charged to generate the smallest amplitude level in each of said N bands, (f) a first converter connected to the output of said amplitude discriminator for converting the discriminator output signal response to the smallest steps into the N most significant digits of the pulse code signal, (g) logic means connected to the output of said amplitude discriminator and to said waveform generator for receiving the discriminator output signal response to said smallest steps and actuating said generator to sequentially generate the amplitude levels in the band containing said signal amplitude, and (h) a second converter connected to the output of said discriminator for converting the output signal response thereof to said band of amplitude levels into the remaining digits of said pulse code signal, the output signals of said first and second converters comprising the resultant pulse code signal.

References Cited

UNITED STATES PATENTS

| | | | |
|---|---|---|---|
| 2,834,883 | 5/1958 | Lukoff | 328—151 |
| 2,918,669 | 12/1959 | Klein | 340—355 |

ROY LAKE, *Primary Examiner.*